UNITED STATES PATENT OFFICE.

ERWIN EMIL ALBERT GEORG MEYER, OF NEW BRUNSWICK, NEW JERSEY.

PROCESS OF RECLAIMING DEVULCANIZED RUBBER.

936,468.    Specification of Letters Patent.    Patented Oct. 12, 1909.

No Drawing.    Application filed May 4, 1907.    Serial No. 371,944.

*To all whom it may concern:*

Be it known that I, ERWIN EMIL ALBERT GEORG MEYER, a subject of the German Emperor, residing at New Brunswick, State of New Jersey, have invented certain new and useful Improvements in Processes of Reclaiming Devulcanized Rubber, of which the following is a specification.

The object of my invention is a process of converting devulcanized rubber by depolymerization into a rubber which possesses practically the properties of natural rubber. By the term "devulcanized rubber" as here used, I mean rubber which has once been vulcanized and afterward subjected to a treatment to remove substantially all the added ingredients.

My invention consists in treating devulcanized rubber with a neutral soap preferably made of the resin which accompanies natural rubber. In this manner the devulcanized rubber is depolymerized and thus assumes again the properties characteristic of natural rubber. The soap is produced by saponifying that resin which accompanies natural rubber.

Rubber in the devulcanized state cannot be used for manufacturing purposes with the same success as natural rubber, but rubber in the depolymerized state, as obtained by practicing this invention, assumes again the properties characteristic of natural rubber and can then be used in the same manner, with practically the same success as the natural product.

In the manufacture of rubber articles, mineral matter of various kinds are added, while the rubber itself is also partially replaced by substances, generally consisting of some form of solidified oils such as blown oils. These additions in general can be easily removed in the process of recovery of waste rubber; but, one material which is contained in nearly all forms of manufactured rubber is very difficult to remove again, without injury to the original rubber substance, and that is the sulfur used in vulcanizing. Our modern theory assumes that this sulfur enters partly into chemical combination with the rubber substance, and partly remains as such in the manufactured rubber, and it is believed that the hydrocarbons contained in the original rubber substance undergo the so-called process of polymerization by the action of sulfur and heat. Acids and alkalies and organic solvents have been used for the removal of the mineral matter and solidified oils, and for dissolving out the rubber substance, and it is obvious that those chemicals which have the least injurious influence on the original rubber substance would prove the best materials for the recovery of waste rubber.

The steps and chemicals used in my process differ from all methods and all processes known in the prior art, in that they apparently depolymerize the hydrocarbons of the rubber substance, without any other change or injurious secondary action, and bring them back nearest to their original form of molecular constitution in which they are contained in the natural rubber, for the product obtained in my process can be practically used like natural rubber for all purposes.

In order to carry out my process practically I proceed as follows: I employ devulcanized rubber obtained according to any of the processes described in the art, but I prefer that devulcanized article, the production of which I describe and claim in my application, Serial No. 371,946, and which is made as follows: Rubber waste is cut up into small pieces and mechanically separated from textile fibers and metallic particles. If the textile fiber is so intimately mixed with the rubber that it cannot be separated mechanically, the textile fiber must be removed by a carbonizing process with acids. Whatever is done in this preliminary treatment, the rubber waste must be practically free from moisture before the subsequent addition of the solvents. The dry and comminuted rubber is then treated with a liquid in a strongly built iron vessel provided with a stirring mechanism and condenser, so that the treatment of the material may be carried on at high temperature and pressure. This vessel is also connected with a pump which supplies the necessary liquid from two separate tanks. For each kilo of waste about six liters of liquid is employed. The quantity is, however, entirely dependent on the kind of waste to be treated. The composition of the liquid also depends upon the grade of waste. In practice I have found the following proportions to act satisfactorily:

2 parts of rubber solvent to 8 parts of acetone
3 parts of rubber solvent to 7 parts of acetone
4 parts of rubber solvent to 6 parts of acetone As a rubber solvent I can use phenol, chloroform, naphtha, gasolene, nitro-benzene, mixtures thereof, or other organic solvents for rubber. Instead of acetone I can use ethyl alcohol. The treatment lasts usually from two to five hours according to the material, and the temperature to be employed for the treatment must also be varied accordingly. If such rubber substitutes as factis are present, the following treatment is additionally recommended. An alcoholic solution of caustic soda containing about two to five per cent. of the alkali is added to the rubber waste after the solvents employed in the prior treatment have been removed. Of this solution enough is employed to perfectly cover the rubber waste. The whole mass is then heated for about two to five hours at the boiling point of the alcohol and stirred at the same time. The time of treatment varies with the quality of rubber waste. The product thus obtained will be a good quality of devulcanized rubber. Instead of an alcoholic solution of sodium hydroxid, I can also use an alcoholic solution of potassium hydroxid, barium hydroxid, etc. The devulcanized rubber is then treated with a neutral soap preferably made from resin which accompanies natural rubber, and is prepared as follows: One hundred kilos of rubber resin are heated with two hundred kilos of water, to which twenty kilos of sodium hydroxid are added; the mass is boiled, and to the boiling liquid five kilos of sodium carbonate are added. For each one hundred kilos of rubber to be treated, ten kilos of resinous soap are taken. Then the rubber is heated with the soap to a temperature of about 140 to 210 degrees C., at a pressure of from three to fifteen atmospheres, according to the quality of material to be treated. The treatment may last from two to five hours. For some rubber waste it is advantageous to employ a larger quantity of resinous soap, and good results were obtained by increasing the amount of resinous soap to thirty per cent. of the quantity of the waste rubber used in the process. It has also been found that the resins extracted from some qualities of natural rubber do not easily yield soaps which can be successfully employed in the process of depolymerization. The production of the resinous soap might then advantageously be modified as follows: To one hundred parts of resin ten parts of cocoanut oil are added and this mass is heated with a solution containing ten parts of caustic soda, dissolved in fifty parts of water, and two parts of sodium carbonate, also dissolved in fifty parts of water. To this mixture two hundred parts of water are gradually added until a complete solution is obtained. The resin soap might also be made by melting together the proper amount of resin with alkali in solid form, and dissolved by boiling with water afterward.

In employing the resin as soap it is of importance to avoid the presence of free alkali. Careful neutralization of the soap is accomplished by adding the requisite amount of a free fatty acid, like oleic acid, or by such acids as acetic acid, or by phenolic compounds, capable of forming salts with alkalies, such as carbolic acid.

Although I have above described an example of carrying out my new process of depolymerizing devulcanized rubber, I do not wish to be understood as excluding from my claim equivalents for the ingredients, the apparatus, or the operations employed in the process. It is probable that substitutes may be employed without departing from the scope of the process intended to be secured hereby.

When I use the term "devulcanized rubber" I mean specifically rubber waste which has been subjected to a treatment for the removal of sulfur and filling ingredients. Of course, none of such treatments wholly removes the materials added to the rubber.

Having now described my invention and in what manner the same is to be performed, what I claim as new and desire to secure by Letters Patent is:

1. The process of depolymerizing devulcanized rubber consisting in treating devulcanized rubber with a neutral resinous soap at temperatures over 120° C.

2. The process of depolymerizing devulcanized rubber, consisting in treating devulcanized rubber with a neutral resinous soap associated with an oil capable of saponification at a temperature in excess of 120° C.

3. The process of depolymerizing devulcanized rubber consisting in treating devulcanized rubber with a neutral resinous soap associated with an oil capable of saponification under pressure in excess of atmospheric pressure and at a temperature in excess of 120° C.

4. The process of depolymerizing rubber waste, which consists in first devulcanizing the same by treating it with a mixture of two solvents, the one of which is a rubber solvent, while the other is not, and finally treating it with a neutral resinous soap at a temperature in excess of 120° C. and under pressure in excess of atmospheric pressure.

5. The process of depolymerizing rubber waste, which consists in first devulcanizing the same by treating it with a mixture of two solvents, the one of which is a rubber solvent, while the other is not, and finally treating it at high temperature and pressure with a neutral resinous soap made from the resin accompanying natural rubber.

6. The process of depolymerizing rubber waste, which consists in first devulcanizing the same by treating it with a mixture of rubber solvent and acetone, and finally treating it with a neutral resinous soap, at a temperature in excess of 120° C.

7. The process of depolymerizing rubber waste, which consists in first devulcanizing the same by treating it with a mixture of rubber solvent and acetone, and finally treating it with a neutral resinous soap made from the resin of natural rubber, at high temperature and pressure.

8. The process of depolymerizing rubber waste, which consists in first devulcanizing the same by treating it with a mixture of rubber solvent and acetone, and finally treating it at high temperature and pressure with a neutral resinous soap made from the resin accompanying natural rubber associated with an oil capable of saponification.

9. The process of depolymerizing rubber waste, which consists in first devulcanizing the same, by treating it with a mixture of two solvents, the one of which is a rubber solvent while the other is not, and subjecting it to the action of an alcoholic solution of a hydroxid possessing a saponifying action, and finally treating it with a neutral resinous soap made from the resin of natural rubber.

10. The process of depolymerizing rubber waste, which consists in first devulcanizing the same by treating it with a mixture of two solvents, the one of which is a rubber solvent while the other is not, then subjecting it to the action of an alcoholic solution of a hydroxid possessing a saponifying action and finally treating it with a neutral resinous soap made from the resin of natural rubber associated with an oil capable of saponification.

11. The process of depolymerizing rubber waste, which consists in first devulcanizing the same by treating it with a mixture of two solvents, the one of which is a rubber solvent while the other is not, and subjecting it to the action of an alcoholic solution of a hydroxid possessing a saponifying action, and finally treating it, at high temperature and pressure, with a neutral resinous soap made from the resin of natural rubber associated with an oil capable of saponification.

In witness whereof, I have signed my name in the presence of two witnesses.

ERWIN EMIL ALBERT GEORG MEYER.

Witnesses:
H. RICHARD WOBSE,
Y. FRANK GUENERT.